United States Patent
Song et al.

(10) Patent No.: US 8,843,650 B2
(45) Date of Patent: Sep. 23, 2014

(54) TRUSTED NETWORK BOOTING SYSTEM AND METHOD

(75) Inventors: Zhexuan Song, Sunnyvale, CA (US); Joseph Gordon, Berkeley, CA (US)

(73) Assignee: Fujitsu Limited, Kawasaki (JP)

(*) Notice: Subject to any disclaimer, the term of this patent is extended or adjusted under 35 U.S.C. 154(b) by 226 days.

(21) Appl. No.: 13/346,574

(22) Filed: Jan. 9, 2012

(65) Prior Publication Data

US 2013/0179669 A1 Jul. 11, 2013

(51) Int. Cl.
*G06F 15/16* (2006.01)

(52) U.S. Cl.
USPC ............ 709/229; 726/22; 726/23; 726/24; 726/25; 713/189; 713/194; 717/168; 717/170; 717/172; 717/173

(58) Field of Classification Search
USPC .......................................................... 709/229
See application file for complete search history.

(56) References Cited

U.S. PATENT DOCUMENTS

| | | | | |
|---|---|---|---|---|
| 6,560,706 | B1* | 5/2003 | Carbajal et al. | 713/155 |
| 7,062,643 | B2* | 6/2006 | Miyajima | 713/1 |
| 7,337,310 | B2* | 2/2008 | Cheston et al. | 713/1 |
| 2009/0013406 | A1* | 1/2009 | Cabuk et al. | 726/22 |
| 2009/0089860 | A1* | 4/2009 | Forrester et al. | 726/3 |
| 2009/0282142 | A1* | 11/2009 | Tamura et al. | 709/223 |
| 2010/0203955 | A1* | 8/2010 | Sylla | 463/25 |
| 2010/0262815 | A1* | 10/2010 | Bozek et al. | 713/1 |
| 2011/0060947 | A1* | 3/2011 | Song et al. | 714/37 |
| 2011/0246613 | A1* | 10/2011 | Chen et al. | 709/219 |
| 2011/0246778 | A1* | 10/2011 | Duane | 713/176 |
| 2012/0264508 | A1* | 10/2012 | Sylla | 463/29 |
| 2013/0173898 | A1* | 7/2013 | Berg et al. | 713/2 |

FOREIGN PATENT DOCUMENTS

EP    2169908 A1 *  3/2010

OTHER PUBLICATIONS

Stefan et al., "VTPM: Virtualizing the Trusted Platform Module", USENIX Security Symposium 2006.*

* cited by examiner

*Primary Examiner* — Tauqir Hussain
(74) *Attorney, Agent, or Firm* — Maschoff Brennan

(57) ABSTRACT

A system for trusted network booting of a server. The system may include a booting server that may contain a booting image and a network server that may boot with the booting image from the booting server. The network server may include a trust anchor that measures the booting image. The system may further include a network controller that controls access to a network. The network controller may verify the measurement of the booting image before allowing the network server to access the network.

18 Claims, 5 Drawing Sheets

TRUSTED NETWORK BOOTING SYSTEM AND METHOD

FIELD

The embodiments discussed herein are related to digital processing systems.

BACKGROUND

Data networks, such as data clouds, may be formed using one or more servers, databases, and other digital processing type components to provide computation, software, data access, storage services, and other services to users through networked based tools, such as web-based applications. Generally, a user may provide a network provider with software, data, or other objects for placement in a network. The user may later access the software, data, or other objects using networked based tools.

A data network provider's responsibility may be to provide a user access to the network and to provide security to safely maintain a user's software, data, physical and personal security, and identity that is stored on the network. To provide this security, the network provider may attempt to ensure that only trusted servers, databases, and other digital type components access the network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system may include a booting server that may contain a booting image and a network server that may boot with the booting image from the booting server. The network server may include a trust anchor that obtains a measurement of the booting image. The system may further include a network controller that controls access to a network. The network controller may verify the measurement of the booting image before allowing the network server to access the network.

The object and advantages of the embodiments will be realized and achieved by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

Example embodiments will be described and explained with additional specificity and detail through the use of the accompanying drawings in which.

DESCRIPTION OF EMBODIMENTS

Data networks, such as data clouds, may be formed from one or more servers and other components. When a data network is formed and during some operating conditions, additional servers may be added to the data network. To add servers to the data network, the servers may first be locally or network booted. In the case of secure data networks, only trusted servers may join the secure data network to maintain the integrity of the secure data network.

To establish a trusted server that may join a secure data network, a server may include a trust anchor that is trusted by the secure data network. The trust anchor may measure internal software or firmware run by the server as well as software downloaded over a network during the network booting process. In general, the trust anchor may capture the state of the server after it is booted. The trust anchor may send the measurements to a network controller that controls access to the secure data network. The network controller may verify that the server is in a trusted state using the measurements taken by the trust anchor. If the server is in a trusted state, the server may be allowed to join the secure data network.

Further details and embodiments of the present invention will be explained with reference to the accompanying drawings.

Figure 1:
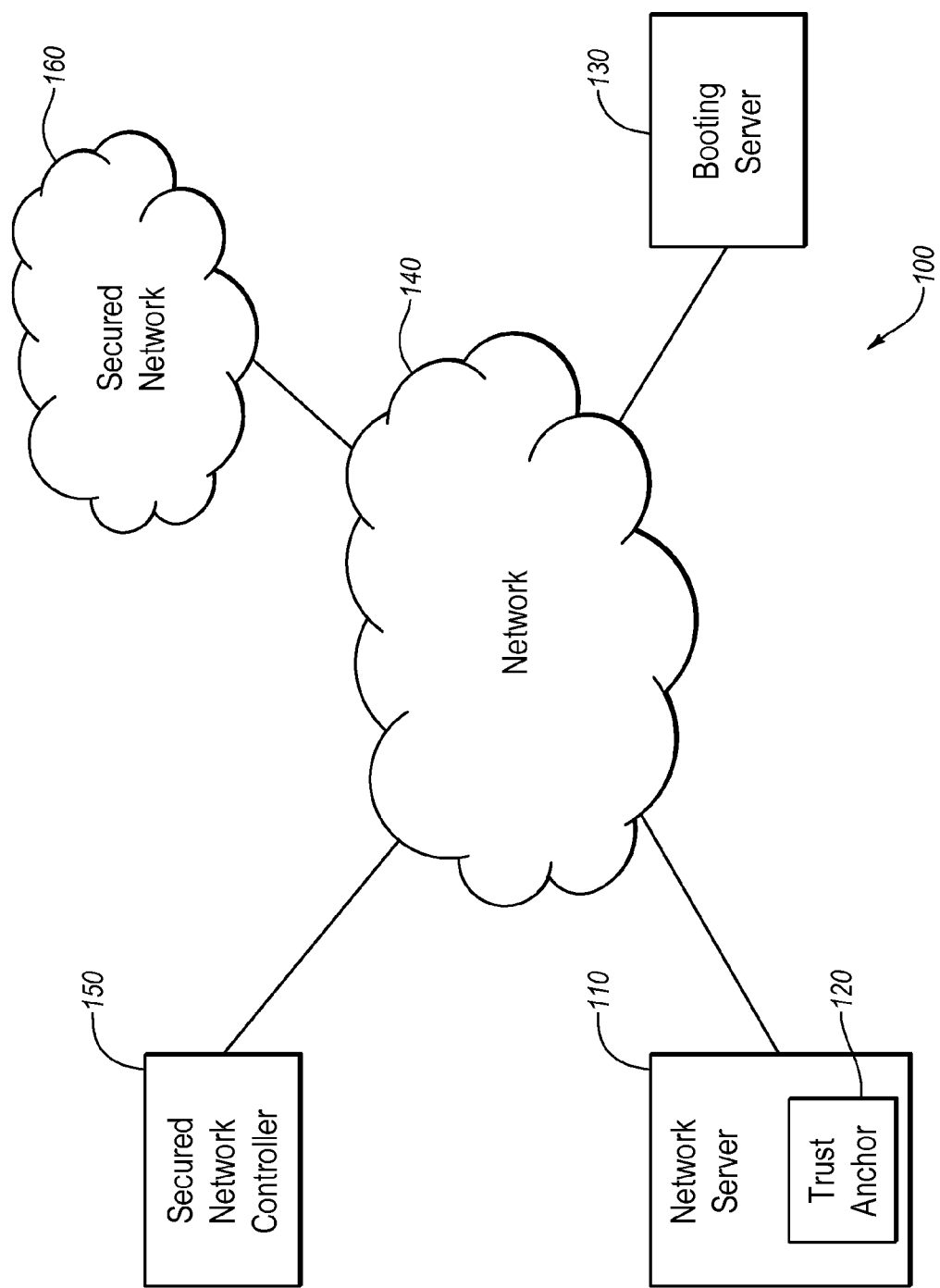
FIG. 1 illustrates a system that provides for trusted network booting of network servers.

FIG. 1 illustrates a system 100 that provides for trusted network booting of network servers, arranged in accordance with at least some embodiments described herein. The system 100 may include a network 140 that communicably couples a network server 110, a booting server 130, a secured network controller 150, and a secured network 160.

According to the illustrated embodiment, the system 100 may operate to boot remote servers that may then be joined into the secured network 160. The network server 110 is an example of a remote server that may be joined to the secured network 160. The system 100 may first power on the network server 110 and measure the initial software or firmware run by the network server 110 using a trust anchor 120 within the network server 110. The network server 110 may then boot from the network 140 using the booting server 130. As the network server 110 is receiving a booting image and other software modules from the booting server 130, the trust anchor 120 may measure the booting image and the software modules.

After the network server 110 is booted, the trust anchor 120 may send the measurements of the initial software, booting image, and the software modules in a signed report to the secured network controller 150. The secured network controller 150 may check the signature of the trust anchor 120 to verify that the trust anchor 120 may be trusted. The secured network controller 150 may then verify the measurements of the initial software, booting image, and the software modules to determine if the network server 110 may be trusted.

After the secured network controller 150 verifies that the network server 110 is trusted, the network server 110 is allowed to join the secured network 160. If the network server 110 is found not to be trusted, the network server 110 may be denied access to the secured network 160. The system 100 thus provides a structure for allowing individual trusted remote servers, such as the network server 110, to be network booted and joined to the secured network 160. The secured network controller 150 may only trust a trust anchor within the individual remote servers before allowing the individual remote servers to join the secured network 160. In contrast, other network booting environments may need multiple layers of trust to be developed before allowing an individual remote server to join a secured network.

Levels of trust or how a remote server, such as the network server 110, is determined to be trusted may vary. In some embodiments, a remote server may be considered trusted if neither the remote server nor any of the firmware or software running thereon has been compromised, changed, altered, or otherwise affected by any source without knowledge of an operator of the system 100. In some embodiments, a remote server may be considered trusted if a trust anchor within the remote server is unable to detect if the remote server or any of the firmware or software running thereon has been compromised, changed, altered, or otherwise affected by any source without knowledge of an operator of the system 100. Likewise, in some embodiments, a remote server may be considered trusted if a trust anchor within the remote server is verified and the trust anchor is unable to detect if the remote server or any of the firmware or software running thereon has been compromised, change, altered, or otherwise affected with or without knowledge of an operator of the system 100. Likewise, in some embodiments, a remote server may be considered trusted if a trust anchor within the remote server is verified and the trust anchor is only able to detect minor changes or alterations to the remote server or any of the firmware or software running thereon. It should be understood from the foregoing what a trusted network boot of a server generally entails and that different degrees of trust may exist and may be defined by an operator of a network.

Figure 2:
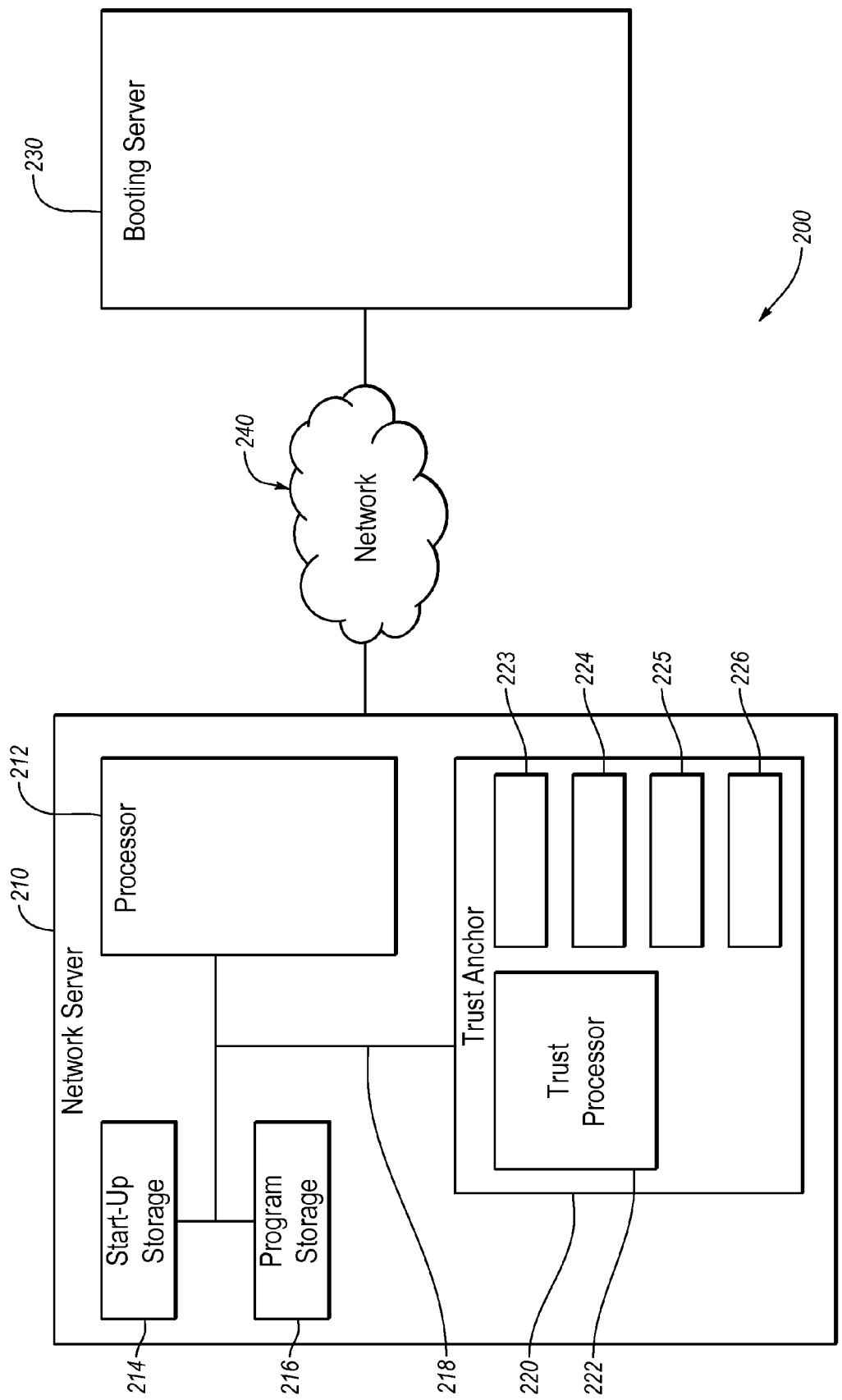
FIG. 2 illustrates part of a system that provides trusted network booting of a network server.

FIG. 2 illustrates a subsystem 200 that may assist in providing trusted network booting of a network server, arranged in accordance with at least some embodiments described herein. The subsystem 200 may include a network server 210 that is communicably coupled to a booting server 230 through a network 240. The network server 210 may include a processor 212, start-up storage 214, program storage 216, and a communication bus 218 that connects the processor 212, start-up storage 214, and the program storage 216 to a trust anchor 220. The trust anchor 220 may include a trust processor 222 and first, second, third, and fourth storage units 223, 224, 225, 226.

To perform a trusted network boot of the network server 210 according to some embodiments, the network server 210 is first powered on. At power-up, the processor 212 may access a program stored in the start-up storage 214. In some embodiments, the start-up storage 214 may be any type of non-volatile memory, including, but not limited to, flash memory, read-only memory, and magnetic memory. In some embodiments, the program held in the start-up storage 214 may be a basic input/output system (BIOS) firmware used by the network server 210 at start-up to perform basic functions for network booting.

At power-up, the trust processor 222 also reads and measures the program in the start-up storage 214. In some embodiments, the trust processor 222 may measure the program by generating a value that is a probabilistically unique identifier of the program, such as, but not limited to, a hash value, checksum, fingerprint, or check digit. In some embodiments, the trust processor 222 may read and measure the program before the program is run by the processor 212. In some embodiments, the trust processor 222 may read and measure the program after the program is run by the processor 212. The trust processor 222 saves the measurement of the program into one of the first, second, third, or fourth storage units 223, 224, 225, 226.

After the network server 210 loads the program from the start-up storage 214, the network server 210 may perform one or more operations per the program to locate the booting server 230 over the network 240. After locating the booting server 230, the network server 210 may download a booting image from the booting server 230. The booting image may be saved in the program storage 216. In some embodiments, the program storage 216 may be any writable non-volatile memory, including, but not limited to flash memory, or any volatile memory, including, but not limited to any type of RAM, such as DRAM, SRAM and others. The network server 210 may load and run the booting image from the program storage 216.

The trust processor 222 may also measure the booting image from the booting server 230. In some embodiments, the trust processor 222 may measure the booting image by generating a value that that is a probabilistically unique identifier of the booting image such as, but not limited to, a hash value, checksum, fingerprint, check digit, or randomization function. In some embodiments, the trust processor 222 may measure the booting image before the booting image is saved to the program storage 216 or run by the processor 212. In some embodiments, the trust processor 222 may measure the booting image after the booting image is run by the processor 212. The trust processor 222 saves the measurement of the booting image into one of the unoccupied first, second, third, or fourth storage units 223, 224, 225, 226.

As the booting image is run by the processor 220, it may direct the network server 210 to download software modules from the booting server 230. Each software module may be stored by the network server 210 in the program storage 216 and then loaded and run by the processor 212. The software modules may include software programs for running an operating system, virtual machine manager, or other programs on the network server 210.

The trust processor 222 may also measure the software modules from the booting server 230. In some embodiments, the trust processor 222 may measure the software modules by generating a value that is a probabilistically unique identifier of the software modules, such as, but not limited to, a hash value, checksum, fingerprint, check digit, or randomization function. In some embodiments, the trust processor 222 may measure the software modules before the software modules are saved to the program storage 216 or run by the processor 212. In some embodiments, the trust processor 222 may measure the software modules after the software modules are run by the processor 212. The trust processor 222 saves the measurements of each of the software modules into one of the unoccupied first, second, third, or fourth storage units 223, 224, 225, 226.

In some embodiments, the trust anchor 220 may operate to measure all of, or in some cases only a subset or portion of, the firmware, software, modules, components, programs, images, or other objects downloaded from the booting server 230 or any other server connect to the network 240. Alternately or additionally, the trust anchor 220 may operate to measure all of, or in some cases only a subset or portion of, the firmware, software, modules, components, programs, images, or other objects that are run by the network server 210. Alternately or additionally, the trust anchor 220 may operate to measure all of, or in some cases only a subset or portion of, the firmware, software, modules, components, programs, images, or other objects that are stored in any type of memory on the network server 210.

The trust anchor 220 may store each measurement in an individual storage unit, such as storage units 223, 224, 225, 226. The trust anchor 220 may include more or less than four storage units depending on, for instance, the number of measurements that may be taken by the trust anchor 220. In some embodiments, the storage units 223, 224, 225, 226 may be individual registers within the trust anchor 220. In some embodiments, the storage units 223, 224, 225, 226 may be different addressable locations within a memory device within the trust anchor 220.

In some embodiments, the trust anchor 220 may be a trusted platform module (TPM) security device or chip. In some embodiments, the trust anchor 220 may be another type of cryptoprocessor or cryptomicroprocessor. In some embodiments, the trust anchor 220 may be another type of device that is able to perform the functions described herein.

In some embodiments, the network server 210 may implement standard protocols to locate and communicate with the booting server 230. For example, in some embodiments, the network server 210 may boot over the network 240 following pre-boot execution environment protocols or other network booting protocols. Furthermore, in some embodiments, the network server 210, booting server 230, and the network 240 may include additional components other than those illustrated or discussed to enable the network server 210 to boot over the network 240. For example, the network 240 may include a dynamic host configuration protocol (DHCP) server and one or more routers; the booting server 230 may include a file server that stores the booting image and software modules, a trivial file transfer protocol (TFTP) server, and a proxy DHCP server; and the network server 210 may include one or more hardware components for communicating over a network.

Figure 3:
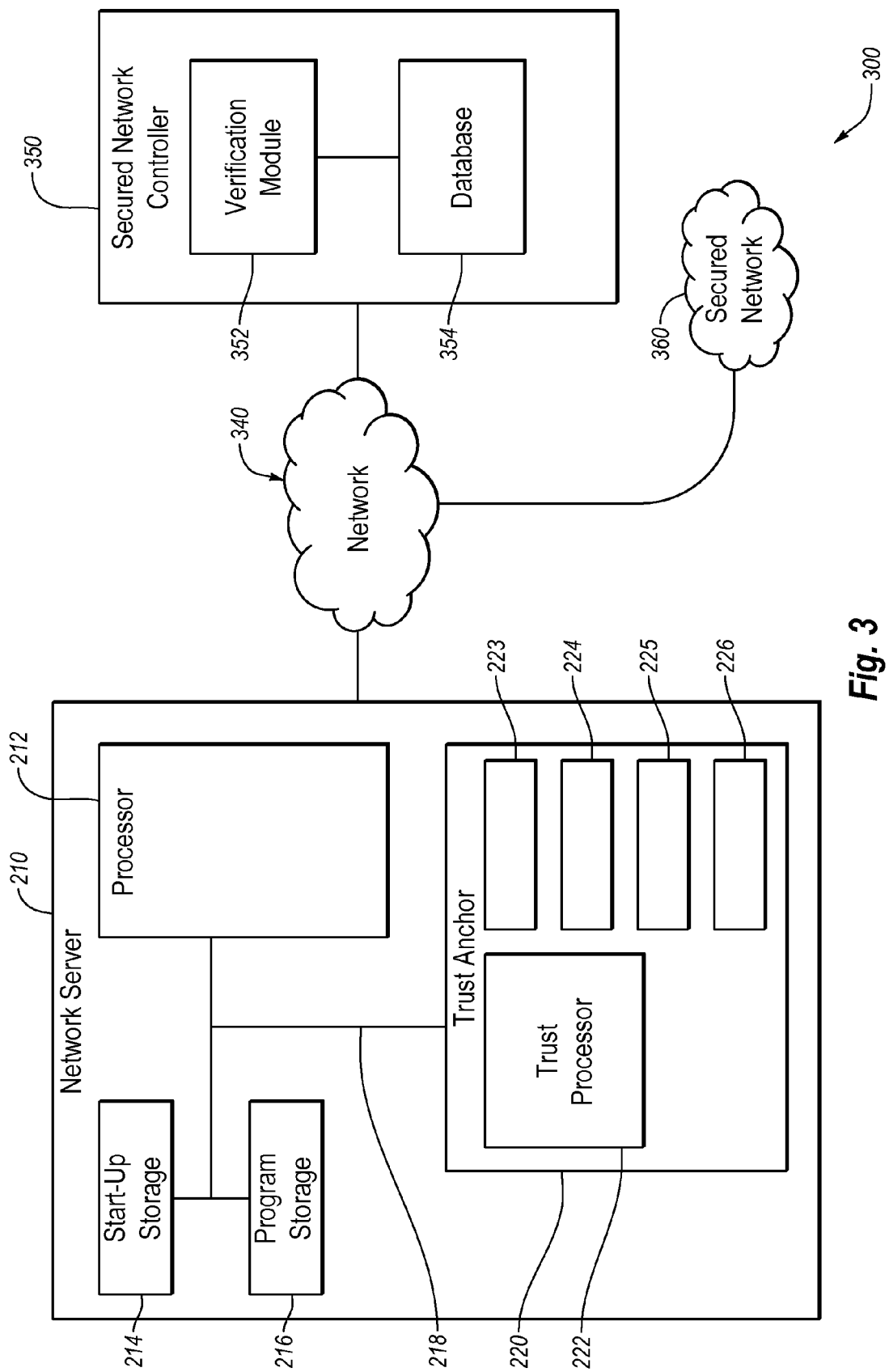
FIG. 3 illustrates part of a system that provides trusted network booting of a network server.

FIG. 3 illustrates a subsystem 300 that may assist in providing trusted network booting of a network server, arranged in accordance with at least some embodiments described herein. The subsystem 300 may include a network server 210, as described with respect to FIG. 2, that is communicably coupled to a secured network controller 350 and a secured network 360 through a network 340.

After the network server 210 has booted and is ready to access the secured network 360 and the trust anchor 220 has measured all the applicable objects running on or within the network server 210, as described with respect to FIG. 2, the trust anchor 220 may generate a report. To generate the report, the trust anchor 220 may compile all of the measurements previously taken and stored in the storage units 223, 224, 225, 226. The report may include identifiers for each measurement to identify what each measurement represents. After compiling the report, the trust anchor 220 may sign and send the report to the secured network controller 350 over the network 340. In some embodiments, signing the report may include the trust anchor 220 including a probabilistically unique identifier associated with the trust anchor 220 within the report.

The secured network controller 350 receives the report from the trust anchor 220. After receiving the report, a verification module 352 within the secured network controller 350 may verify the measurements, signature, time stamp, and other elements of the report. The secured network controller 350 may also include a database 354 that contains a signature of the trust anchor 220 and trusted measurements for each object measured by the trust anchor 220.

To verify the report, the verification module 352 may verify the signature of the trust anchor 220 in the report by comparing the report's signature to the signature within the database 354. If the signatures are identical, the verification module 352 may confirm that the report was generated by a trusted and known trust anchor 220.

The verification module 352 may continue to verify each measurement in the report by comparing the report's measurements with verified measurements from the database 354. Any differences in the measurements may indicate that the objects running on or within the network server 210 have been altered or changed. In some embodiments, variations in any measurements may indicate that the network server 210 may not be trusted.

In some embodiments, the verification module 352 may also verify the time stamp of the report and other aspects of the report. For example, in some embodiments, if the time stamp of the report indicates that the report was not generated within a predetermined amount of time prior to receiving the report, the verification module 352 may determine that the network server 210 may not be trusted. For example, if the report was not generated within a predetermined amount of time prior to receiving the report, the network server 210 may have had time to reboot, which means the report may not accurately reflect the state of the network server 210.

If the verification module 352 verifies the report, the verification module 352 may indicate that the network server 210 is trusted. The secured network controller 350 may then allow the trusted network server 210 to join the secured network 360. If the verification module 352 is unable to verify the report, the network server 210 may not be considered trusted. The secured network controller 350 may deny the untrusted network server 210 access to the secured network 360. In some embodiments, the secured network controller 350 may send a message to a network administer indicating the network server 210 was not trusted. In some embodiments, the secured network controller 350 may take steps to develop trust in the network server 210. This may include rebooting the network server 210 or rebooting a booting server, such as the booting server 230 illustrated in FIG. 2.

In some embodiments, the network 340 may be the same as the network 240 illustrated in FIG. 2. In some embodiments, the secured network 360 may be a secured network environment that is implemented using one or more servers. For example, the secured network 360 may be a cloud environment, cluster-computing network, distributed processing network, or any other type of secured network. In some embodiments, the secured network controller 350 may be a server or some other processor or computing device networked with the network 340 and the secured network 360. In some embodiments, the database 354 may be located outside the secured network controller 350 and networked with the secured network controller 350.

Using the subsystem 300 illustrated in FIG. 3, the secured network controller 350 may only have to trust the trust anchor 220 within the network server 210 once the signature of the trust anchor 220 is verified. The secured network controller 350 may not have to trust a booting server, the network 340, the network server 210, or any other component or object. The subsystem 300 also may not require that multiple layers of trust be established, in contrast with other networked booting systems. Rather, the subsystem 300 may rely on a single layer of trust with the trust anchor 220.

The subsystem 300, in some embodiments, may only be compromised by compromising the trust anchor 220 and causing the trust anchor 220 to falsify a report or by comprising the network controller 350 and changing the known measurement data. Thus, any attacks, alterations, or changes, intentional or unintentional within the network server 210, a booting server, and the network 340 that may affect the status of the network server 210 may be discovered before the network server 210 is allowed to join the secured network 360. Thus, the security of the secured network 360 may be maintained. Furthermore, the subsystem 300 may provide this security while allowing for network booting of the network server 210. Network booting of servers may provide scalability in a system as illustrated in FIG. 4.

Figure 4:
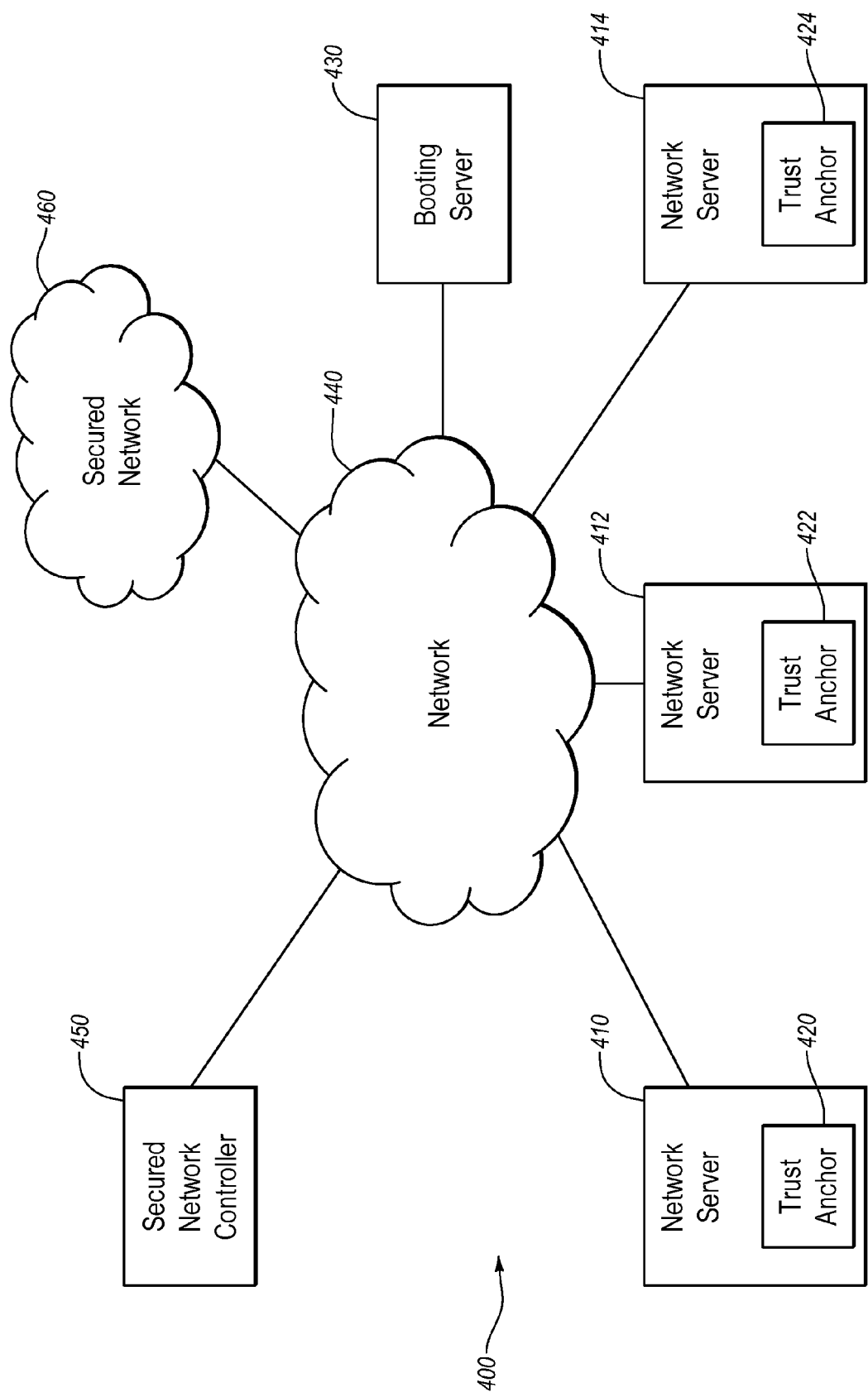
FIG. 4 illustrates a system that provides for trusted network booting of multiple network servers.

FIG. 4 illustrates a system 400 that provides for trusted network booting of multiple network servers, arranged in accordance with at least some embodiments described herein. The system 400 may include a network 440 that communicably couples first, second, and third network servers 410, 412, 414; a booting server 430; a secured network controller 450; and a secured network 460. The first, second, and third network servers 410, 412, 414 may include first, second, and third trust anchors 420, 422, 424 respectively. Each of the first, second, and third trust anchors 420, 422, 424 may have an individual and unique signature that may be known by the secured network controller 450. Verified measurements of each of the first programs run by each of the network servers 410, 412, 414 as well as the booting image and software modules in the booting server 430 may also be known by the secured network controller 450.

According to the illustrated embodiment, the system 400 may operate to boot the first, second, and third network servers 410, 412, 414 and allow each to access the secured network 460. The system 400 may perform a network boot of each of the first, second, and third network servers 410, 412, 414 over the network 440 using the booting server 430. As the first, second, and third network servers 410, 412, 414 are booting and loading software modules from the booting server 430, their corresponding trust anchors 420, 422, 424 may be measuring the initial programs, booting image, and the software modules.

After each of the first, second, and third network servers 410, 412, 414 boots, each trust anchor 420, 422, 424 may send respective measurements of the initial program, booting image, and software modules in a signed report to the secured network controller 450. The secured network controller 450 may check the signature of each trust anchor 420, 422, 424 to verify that each trust anchor 420, 422, 424 may be trusted. The secured network controller 450 may then verify the measurements of the initial programs, booting image, and software modules from each trust anchor 420, 422, 424 to determine if each of the network servers 410, 412, 414 may be trusted. After the secured network controller 450 verifies that each of the network servers 410, 412, 414 is trusted, the network servers 410, 412, 414 may be allowed to join the secured network 460.

In some embodiments, the network servers 410, 412, 414 may be booting and loading software modules simultaneously. In some embodiments, the network servers 410, 412, 414 may boot and load software one at a time or some combination of the network servers 410, 412, 414 may boot and load software at the same time. In some embodiments, the trust anchors 420, 422, 424 may send their respective reports simultaneously after each network server 410, 412, 414 has booted and loaded software. In some embodiments, the trust anchors 420, 422, 424 may send their respective reports to the secured network controller 450 after their respective network server 410, 412, 414 has completed booting and loading software modules and irrespective of the status of the other network servers 410, 412, 414. In some embodiments, the secured network controller 450 may grant each of the network servers 410, 412, 414 access to the secured network 460 simultaneously or individually.

Figure 5:
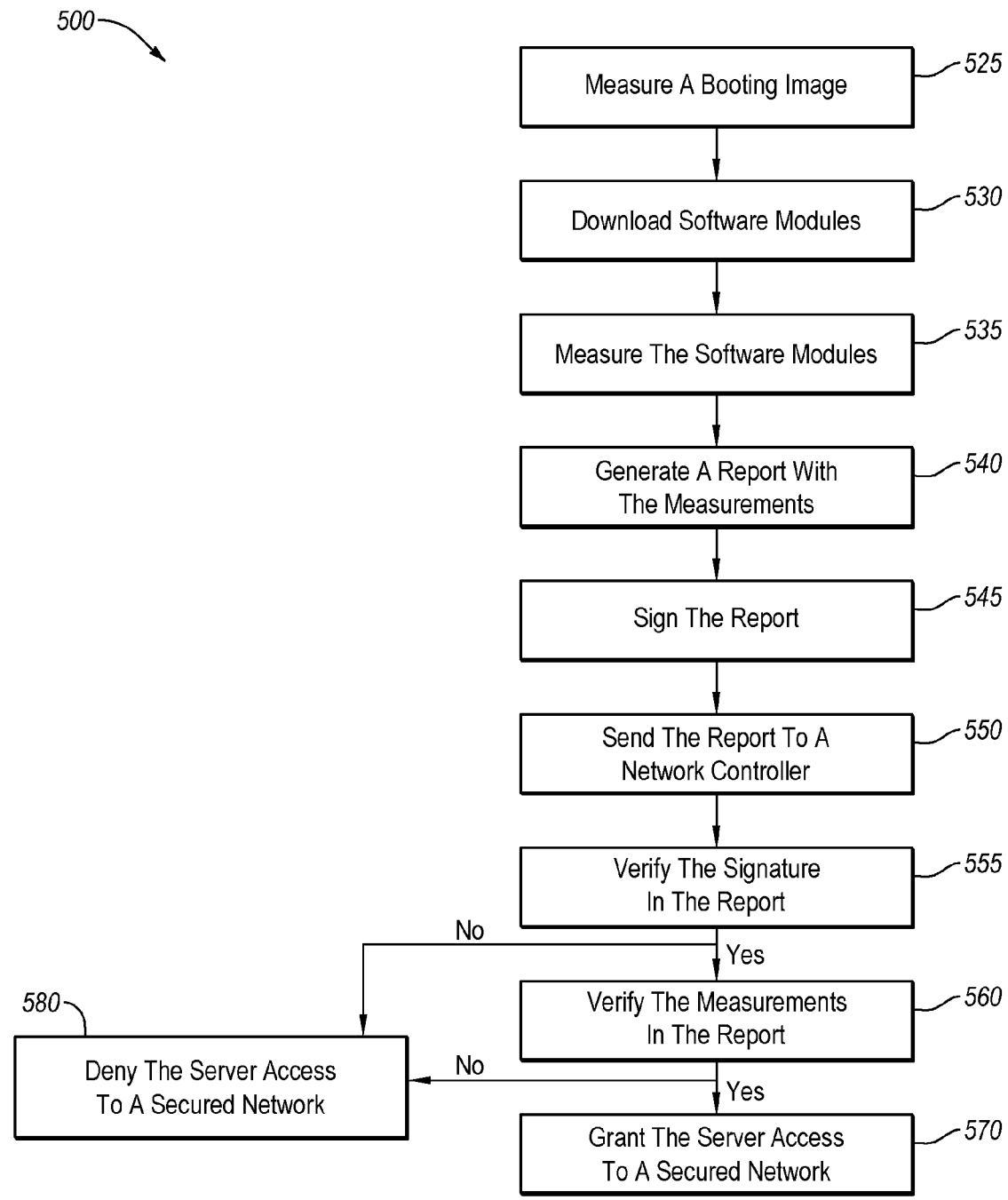
FIG. 5 is an example flowchart of a method for trusted network booting of a server, all arranged in accordance with at least some embodiments described herein.

FIG. 5 illustrates a method 500 for trusted network booting of a server, such as the network server 110 illustrated in FIG. 1, arranged in accordance with at least some embodiments described herein. To commence, at block 525, a trust anchor within the server, such as the trust anchor 120 illustrated in FIG. 1, may measure a booting image downloaded to the server from a booting server. In some embodiments, the trust anchor may measure the booting image before the booting image is stored in memory on the server. In other embodiments, the trust anchor may measure the booting image after the booting image is stored in memory on the server. In some embodiments, the trust anchor may measure the program by generating a value that is a probabilistically unique identifier of the program, such as, but not limited to, a hash value, checksum, fingerprint, check digit, or randomization function. The trust anchor may store the measurement of the program in memory within the trust anchor. In some embodiments, the trust anchor may store the measurement in a register. In some embodiments, the trust anchor may be a trusted platform module chip and may store the measurements in a platform configuration register that provides for secure storage and reporting of the measurement.

The booting image may then be loaded and run by the server. Following the directions of the booting image, at block 530, the server may perform one or more operations to download one or more modules from the booting server. The modules may be software, firmware, images, programs, or other objects. In some embodiments, the modules may be software for a virtual platform machine or other type of operating system. At block 535, the trust anchor may measure the one or more modules downloaded from the booting server. The trust anchor may store the measurements of the downloaded modules in memory within the trust anchor. In some embodiments, the trust anchor may measure the downloaded modules before they are saved on the server. In some embodiments, the trust anchor may measure the downloaded modules after they are saved on the server.

After the downloaded modules are loaded and running on the system, at block 540, the trust anchor may generate a report that includes some or all of the measurements taken by the trust anchor. For example, in some embodiments, the trust anchor may include measurements of the booting image and the downloaded modules. After generating the report, at block 545, the trust anchor may sign the report. The trust anchor may sign the report with a signature or key that is probabilistically unique to the trust anchor. In some embodiments, the trust anchor's signature or key may be a value, such as an RSA key.

At block 550, the trust anchor may send the signed report to a network controller, such as the network controller 160 illustrated in FIG. 1. At block 555, the network controller may verify the signature on the report. In some embodiments, the network controller may verify the signature on the report by comparing the signature on the report to a known signature of the trust anchor that generated the report. If the signature of the report is verified, meaning that the signature of the report matches the known signature of the trust anchor that generated and sent the report, the method 500 may proceed to block 560. In some embodiments, the network controller may also verify other aspects of the report, such as the time stamp, before the method 500 may advance to block 560. If the signature of the report is not verified, the method 500 may proceed to block 580.

At block 560, the network controller may verify the measurements in the report. In some embodiments, the network controller may verify the measurements within the report by comparing the measurements to known measurements. For example, the measurements of the booting image in the report may be compared with known verified booting image measurements. If the measurements are deemed equal, the booting image may be verified, meaning that the booting image has not been changed, altered, or adjusted. If all the measurements within the report are verified, the method 500 may advance to block 570. If any of the measurements are not verified, the method 500 may proceed to block 580.

At block 570, the server may be deemed trusted and may be granted access to a secured network by the secured network controller. In contrast, at block 580, the server may be deemed not trusted and may be denied access to the secured network.

The server may not be deemed trusted for various reasons. Additionally or alternately, the booting image or software modules downloaded to the server may be altered or changed so that the measurements taken by the trust anchor do not equal the measurements stored by the network controller. To rectify these situations, the server may be re-booted and the measurements retaken to determine if the problem was simply an error in the measurements. Additionally or alternately, a system administrator may be notified and may service the server and/or booting server.

As another example, the server may be deemed not trusted if the signature on the report corresponds to a trust anchor that did not send the report. Additionally or alternately, the server may be deemed not trusted if the signature is incorrect. To rectify these situations, the server may be re-booted to re-generate the report or a system administrator may check the server. As another example, the server may be deemed not trusted if the time stamp on the report is outdated. Additionally or alternately, the server may be deemed not trusted if the report is not communicated to the network controller or the report is corrupted as it is transmitted to the network controller. To rectify these situations, the server may be re-booted to regenerate the report or a system administrator may be notified and check the network between the server and the network controller.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, before measuring the booting image at block 525, the server may be powered on. As the server powers on, the trust anchor within the server may measure a program that is run first by the server at the time of power up. The program may then be loaded and run by the server to commence the booting processes. In some embodiments, the program may contain operations that follow a networking booting protocol, such as pre-boot execution environment protocols. In some embodiments, following the program, the server may perform one or more operations to locate a booting server, such as the booting server 130 illustrated in FIG. 1, from which to download the booting image. In some embodiments, locating the booting server may include locating a DHCP server and obtaining an IP address.

An example of the method 500 of FIG. 5 according to one embodiment follows. A data cloud may need an additional server to handle additional capacity. A server with a trust anchor, such as a trusted platform module (TPM) chip, that is communicably linked to the data cloud may be powered on. The BIOS of the server may be measured by the TPM chip and stored in a register within the TPM chip. The BIOS may contain network-booting protocols, such as pre-boot execution environment (PXE) protocols for network booting. The server may follow the protocols and establish a connection with a PXE server.

A booting image may be downloaded to the server from the PXE server. The TPM chip may measure the booting image as it is downloaded and store the measurement within one of its registers. The booting image may be loaded and run and direct the server to download software modules of an operating system from the PXE server. As the software modules are downloaded, the TPM chip may measure each software module and store the measurements within its registers. After the software modules are loaded and run on the server, the TPM chip may generate a report that contains the measurements stored in its registers, sign the report, and send the report to a network controller that controls access to the data cloud.

The network controller may contain the known measurements of the booting image and software images from the PXE server as well as the BIOS of the server and the signature of the TPM chip. Using this information, the network controller may verify the signature and measurements of the BIOS, booting image, and software images within the report by comparing them to the known signature and measurements of the BIOS, booting image, and software images. If all of the measurements are verified, the network controller knows that the server may be trusted and grants the server access to the data cloud. If one of the measurements or other aspects of the report are not verified, the network controller may deny the server access to the data cloud.

Embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media accessible by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended as pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present inventions have been described in detail, it should be understood that the various changes, substitutions, and alterations could be made hereto without departing from the spirit and scope of the invention.

What is claimed is:

1. A system for trusted network booting of a server, the system comprising:
   a booting server that includes a booting image;
   a network server that boots with the booting image of the booting server, the network server including a trust anchor that obtains a measurement of the booting image, wherein the booting server is in a network configuration with the network server in which the network server downloads the booting image from the booting server before the booting server and the booting image are verified and the measurement of the booting image includes one or more of: a hash value, a checksum, a fingerprint, a check digit, a randomization function, and combinations thereof; and
   a network controller to control access to a network, the network controller verifying the measurement of the booting image by comparing the measurement of the booting image obtained by the trust anchor with a verified measurement of the booting image before allowing the network server to access the network.

2. The system according to claim 1, wherein the trust anchor comprises a trust processor within the network server.

3. The system according to claim 2, wherein the trust anchor comprises a trusted platform module (TPM) chip within the network server.

4. The system according to claim 1, wherein the booting server communicates with the network server following pre-boot execution environment protocols.

5. The system according to claim 1, wherein the trust anchor obtains the measurement of the booting image by generating the hash value of the booting image.

6. The system according to claim 1, wherein the network controller verifies a signature of the trust anchor before allowing the network server to access the network.

7. The system according to claim 1, wherein the trust anchor obtains a program measurement of a program run first by the network server at start-up and sends the program measurement of the program to the network controller.

8. A method for trusted network booting of a server, the method comprising:
   requesting a booting image from a booting server for a network server, the booting server being in a network configuration with the network server in which the network server downloads the booting image from the booting server before the booting server and the booting image are verified;
   obtaining a measurement of the booting image downloaded to the network server using a trust anchor within the network server, the measurement of the booting image including one or more of: a hash value, a checksum, a fingerprint, a check digit, a randomization function, and combinations thereof;
   booting the network server using the booting image; and
   sending the measurement of the booting image for verification that the booting image is trustworthy, the verification of the measurement of the booting image being performed by a network controller by comparing the measurement of the booting image obtained by the trust anchor with a verified measurement of the booting image.

9. The method according to claim 8, wherein obtaining the measurement of the booting image includes generating the hash value for the booting image.

10. The method according to claim 8, further comprising verifying a signature of the trust anchor.

11. The method according to claim 8, further comprising measuring each software module downloaded to the network server.

12. The method according to claim 8, further comprising joining the network server to a network if the measurement of the booting image is verified.

13. A processor for operating as a trust anchor in a network server, the processor being adapted to perform acts comprising:
   obtaining a measurement of a booting image received over a first network, the booting image used by the network server to boot, wherein the booting image is obtained from a booting server that is in a network configuration with the network server in which the network server downloads the booting image from the booting server before the booting server and the booting image are verified and the measurement of the booting image includes one or more of: a hash value, a checksum, a fingerprint, a check digit, a randomization function, and combinations thereof; and
   sending the measurements of the booting image for verification to gain access to a second network, the verification of the measurement of the booting image being performed by a network controller by comparing the measurement of the booting image obtained by the trust anchor with a verified measurement of the booting image.

14. The processor according to claim 13, further being adapted to perform acts comprising sending a signature for verification.

15. The processor according to claim 13, further being adapted to perform acts comprising measuring a program run first by the network server at start-up.

16. The processor according to claim 13, wherein obtaining the measurement of the booting image includes generating the hash value for the booting image.

17. A system for trusted network booting of the network server, the system comprising:
   the processor of claim 13 operating as the trust anchor of the network server within the system; and
   the booting server that contains the booting image used by the network server to boot.

18. The system according to claim 17, further comprising the network controller configured to verify the measurement of the booting image and to control access to the second network.

* * * * *